United States Patent Office 2,862,731
Patented Dec. 2, 1958

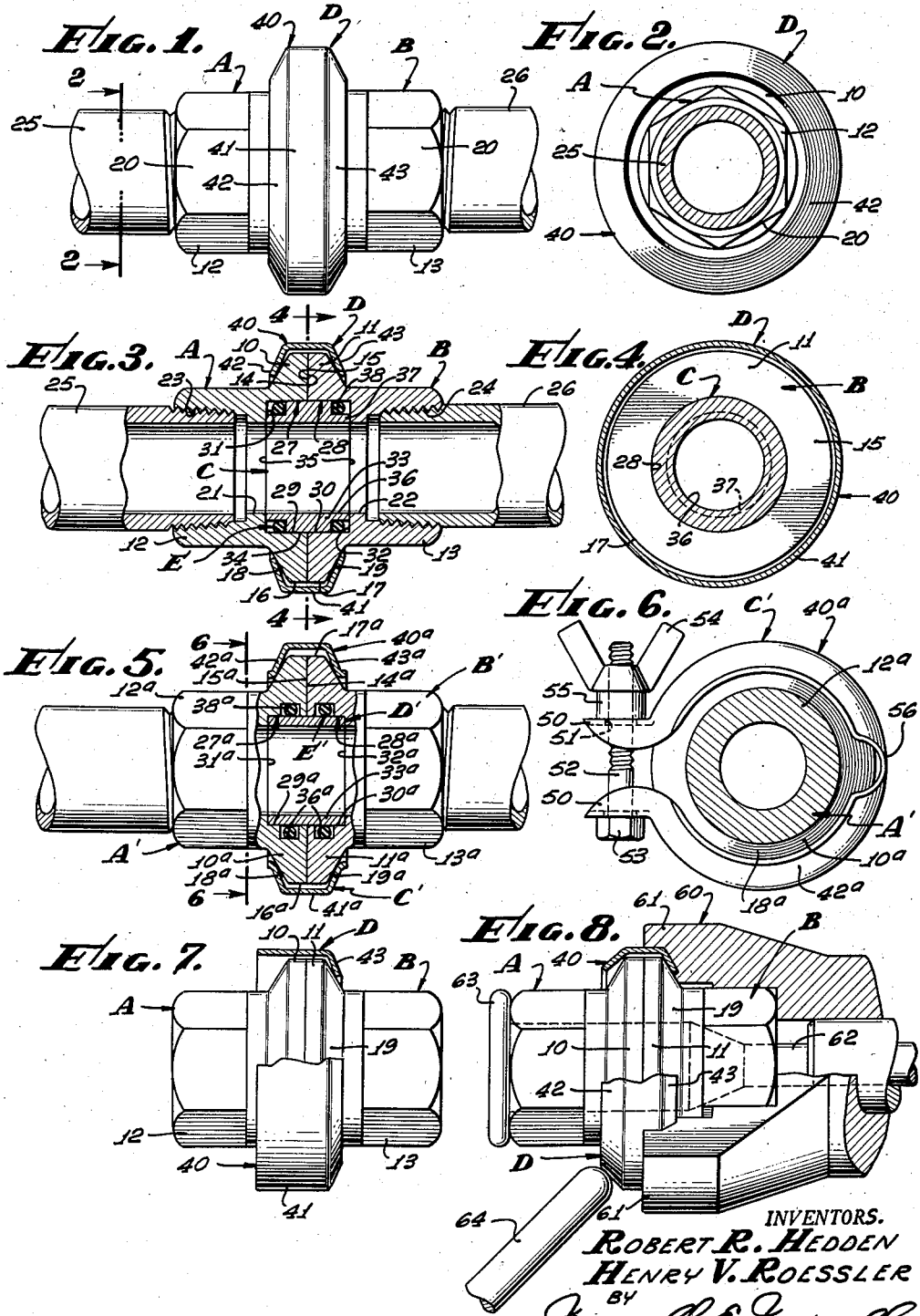

2,862,731

FLANGED, BEND-CLAMPED SWIVEL COUPLING FOR FLUID HANDLING TUBES

Robert R. Hedden, Whittier, and Henry W. Roessler, Pomona, Calif., assignors to Chiksan Company, Brea, Calif., a corporation of California Application April 29, 1955, Serial No. 504,787

1 Claim. (Cl. 285—272)

This is a continuation in part of application Serial No. 436,519, and now abandoned entitled "Swivel Joint Construction," filed on June 14, 1954.

This invention has to do with an improved swivel connection for fluid handling pipes and it is a general object of the invention to provide a simple, practical, highly dependable swivel connection to connect a pair of axially aligned pipes for relative rotation and which will maintain a fluid tight connection under severe operating conditions.

A further object of the invention is to provide a swivel connection that is adjustable to vary the torque required to rotate the pipes relatively to each other.

Another object of the present invention is to provide a swivel connection having few parts, each of which is easy and economical of manufacture.

It is a further object of the invention to provide a swivel connection which is easy to assemble and install and which requires no special skill to manufacture and use.

It is a further object of the present invention to provide a swivel connection of the general character referred to including, two like body sections arranged in end to end relationship and connected to each other against separation and for relative rotation.

Another object of the invention is to provide a swivel connection of the character referred to having a visible exterior coupling sleeve engaged about the exterior of the body sections and adapted to normally yieldingly urge the body sections together and against longitudinal separation, and an interior coupling tube engaged in and extending between the body sections and adapted to maintain the sections in axial alignment and against relative radial shifting.

Still another object of the present invention is to provide a swivel connection having suitable sealing means between the body sections and the coupling tube and preventing passage of fluid from within the construction to the exterior thereof.

The various objects and features of our invention will be fully understood from the following detailed description of typical preferred forms and applications of our invention, throughout which description reference is made to the accompanying drawings, in which:

Fig. 1 is a side elevational view of one form of the swivel connection provided by the present invention. Fig. 2 is an end elevational view of the structure illustrated in Fig. 1 and taken as indicated by line 2—2 on Fig. 1. Fig. 3 is a longitudinal sectional view of the swivel connection illustrated in Fig. 1. Fig. 4 is a transverse sectional view taken as indicated by line 4—4 on Fig. 3. Fig. 5 is a longitudinal view of another form of the present invention and showing parts and portions thereof in section. Fig. 6 is a transverse sectional view taken as indicated by line 6—6 on Fig. 5. Fig. 7 is a longitudinal view of the swivel connection of Fig. 1 and showing the body sections and the coupling sleeves engaged therewith, prior to final assembly of the joint construction. Fig. 8 is a view showing the parts illustrated in Fig. 7 engaged in a suitable chuck-type jig and the coupling sleeve thereof being worked upon to assemble the swivel connection.

The swivel connection provided by the present invention and illustrated throughout the drawings, involves generally, two like axially aligned, tubular body sections arranged in end to end relationship and provided with inner opposed head portions and outer pipe coupling portions. The construction further includes, inner and outer coupling means engageable with the opposed head portions of the body sections to couple the sections together for free relative rotation and against longitudinal and/or radial movement and displacement, and sealing means engageable with the head portions of the body sections and the inner coupling means to prevent leakage from within the swivel connection to the exterior thereof and between the body sections.

Referring first to the form of the invention illustrated in Figs. 1 through 4 of the drawings, the swivel connection involves generally, two like, elongate tubular body sections A and B with inner opposed head portions or flanges 10 and 11 and outer pipe coupling portions 12 and 13, respectively. The construction further includes inner and outer coupling means C and D engageable with the head portions 10 and 11 of the body sections A and B and sealing means E related to the inner coupling means C and engageable with the body sections to seal therewith.

The inner head portions 10 and 11 of the body sections A and B are characterized by flat, radially disposed inner bearing faces 14 and 15, respectively, straight longitudinally disposed outer peripheral walls 16 and 17, and substantially radially disposed outer bearing faces 18 and 19, respectively.

The outer pipe coupling sections 12 and 13 of the body sections A and B are simple, straight longitudinal extensions on the head portions 10 and 11 and project longitudinally outward from the outer bearing faces 18 and 19. The pipe coupling portions 12 and 13 are substantially smaller in diameter than their respective head portions 10 and 11, and in the preferred carrying out of the invention are provided with polygonal outer peripheral walls adapted to establish suitable tool engaging flats 20, to facilitate application and removal of the joint construction to and from the pipes.

The body sections A and B have central longitudinal bores 21 and 22, respectively, which bores establish a central longitudinal flow passage extending through the swivel connection from one end thereof to the other, when the body sections are engaged.

The outer portions of the bores 21 and 22 in the pipe coupling portions 12 and 13 of the body sections A and B, are internally threaded as at 23 and 24 to receive and engage the threaded end portions of suitable flow handling pipes 25 and 26.

The inner opposed head portions 10 and 11 of the body sections A and B are provided with counterbores 27 and 28, concentric with the bores 21 and 22 and defining straight, longitudinally disposed side walls 29 and 30, and flat, radially disposed, inwardly facing bottom walls or shoulders 31 and 32, respectively.

The inner coupling means C, adapted to maintain the body sections A and B in axial alignment and to prevent relative radial shifting of the body sections, also serves to stiffen the swivel connection and to prevent separation or breaking apart of the body sections, as might otherwise take place upon the application of lateral forces upon the connection.

The inner coupling means C is shown as including, a coupling tube 33 extending between the body sections A and B and slidably engaged in the counterbores 27 and 28 of the body sections. The coupling tube 33 has a straight outer peripheral wall 34 which slidably engages the side walls 29 and 30 of the counterbores 27 and 28, flat, radially disposed end walls 35 which oppose the flat bottom walls 31 and 32 of the counterbores, and a straight inner peripheral wall 36 corresponding in diameter with the central bores 21 and 22 in the body sections A and B and cooperating with the body sections to provide a straight, uninterrupted longitudinal flow passage through the connection.

In the particular form of the invention under consideration, the cylindrical center portion of the coupling tube 33 is provided at its ends with longitudinal extensions of continuations 37, of reduced diameter, which establish longitudinally and radial outwardly opening notches at the end portion of the tube, which notches cooperate with the side and bottom walls of the counterbores 27 and 28 to define annular seal chambers adapted to accommodate and carry the sealing means E. In practice, the extensions 37 slidably engage the bottom walls of the counterbores when the body sections are in tight or butted engagement with each other.

The sealing means E that we provide is adapted to seal between the coupling tube 33 and the body sections A and B to prevent fluid within the connection from flowing between the tube and the body sections and then outwardly between the opposed ends of the body sections. The sealing means E is shown as including, a simple rubber O-ring 38 engaged around each of the extensions 37 at the ends of the coupling tube 33, so that the seals 38 are disposed within the annular seal chambers defined by the tube, the extensions and the respectively related body sections. The O-rings 38 establish sliding sealing engagement with the extensions on the tube and with the side walls of the counterbores, but the seal chambers are of greater axial extent than the seal rings 38, as clearly shown in Fig. 3, so that reliance is placed solely on the engagement of the seal rings 38 with the cylindrical walls 29 and 30 of the counterbores 27 and 28 and with the cylindrical outer peripheral walls of the extensions 37, to prevent leakage between the tube 33 and the body sections A and B.

The outer coupling means D adapted to couple and normally yieldingly urge the body sections together also serves to check and/or prevent excessive longitudinal movement and displacement of the body sections relative to each other and disengagement of the body sections from the coupling tube 33 of the inner coupling means C.

The outer coupling means D in the form of the invention under consideration includes a simple, unitary, annular coupling sleeve 40 engaged about the exterior of the head portions 10 and 11 of the body sections A and B, and is preferably formed of resilient steel, or other resilient material. The coupling sleeve 40 is characterized by a main or middle portion 41 extending between the body sections to overlie the peripheral walls 16 and 17 of the head portions 10 and 11 thereof, and has substantially radially inwardly projecting resilient bearing flanges 42 and 43 at its opposite ends and adapted to slidably engage the outer bearing faces 18 and 19 of the head sections 10 and 11, and to normally yieldingly urge the said sections together.

In assemblying the form of the swivel connection now under consideration, the O-rings 38 are first engaged around the reduced extensions 37 on the coupling tube 33, one end of the coupling tube with the O-ring 38 related thereto is then engaged in the counterbore of one of the body sections, and then the other body section is engaged on the other end of the coupling tube and so that the inner bearing faces 14 and 15 of the body sections oppose each other. The body sections A and B, inner coupling means C, and sealing means E, having been assembled as above described, the coupling sleeve 40 of the outer coupling means D is then engaged around the head portions 10 and 11 of the body sections.

The coupling sleeve 40 prior to being applied to the swivel connection, is a straight piece of tube stock of desired diameter and wall thickness, and is cut to desired length. The length of tube stock forming the coupling sleeve 40 is engaged around the head portions 10 and 11 of the assembled body sections A and B so that the end portions thereof project beyond the outer bearing faces 18 and 19. The said projecting end portions of the sleeve are then turned radially inwardly, as by spinning or the like, until they engage and bear against the outer bearing faces 18 and 19 and establish resilient bearing flanges 42 and 43. In practice, the bearing flanges 42 and 43 are turned inwardly so that they are inclined relative to the outer bearing faces 18 and 19 so that only their inner peripheral edges normally engage the outer baring faces.

In practice, one of the bearing flanges 42 or 43, of the coupling sleeve 40 can be formed on the sleeve prior to being applied to the swivel connection, which procedure greatly facilitates and speeds assembly of the joint construction.

From the foregoing, it will be apparent that the flat, opposed, radially disposed inner bearing faces 14 and 15 of the head portions 10 and 11, of the body sections A and B, allow for free relative rotation between the body sections and also lend stability to the connection and help to maintain the body sections in proper aligned relationship. It will also be apparent that the coupling tube 33 of the inner coupling means C maintains the body sections A and B in axial alignment and prevents relative radial shifting. Still further, it will be apparent that the resilient bearing flanges 42 and 43 of the coupling sleeve 40, slidably engage the outer bearing faces 18 and 19 of the body sections and yieldingly urge the said sections together, and yet exert a minimum of frictional drag and allow for free relative rotation between the body sections.

In Figs. 5 and 6 of the drawings, we have illustrated a slightly different form of the present invention. In this form of the invention, the body sections A' and B' are alike and include inner head portions 10ª and 11ª, and outer pipe coupling portions 12ª and 13ª. The head portions 10ª and 11ª are similar to the portions 10 and 11 illustrated in the first described form of the invention and are provided with flat, radially disposed inner opposed bearing faces 14ª and 15ª, outer peripheral walls 16ª and 17ª, and outer bearing faces 18ª and 19ª, respectively. The outer pipe coupling portions 12ª and 13ª, and the sealing means E' are similar to the portions 12 and 13 and sealing means E in the form of the invention illustrated in Figs. 1 through 4 of the drawings.

The inner coupling means D' and the manner of mounting the sealing means E' in the form of the invention shown in Figs. 5 and 6 in the drawings, are slightly different from the corresponding features of the form of the invention shown in Fig. 3 of the drawings. In this second form of the invention, the body sections A' and B' are provided with opposed axially aligned counterbores 27ª and 28ª, with straight cylindrical side walls 29ª and 30ª and flat, bottom walls 31ª and 32ª, respectively. The body sections are further provided with radially inwardly opening recesses 36ª in the side walls 29ª and 30ª of the counterbores 27ª and 28ª. The recesses 36ª in the counterbores 27ª and 28ª are substantially midway between the bottom walls of the counterbores and the inner ends of the body sections that form the bearing faces 14ª and 15ª.

The inner coupling means D' includes an elongate coupling tube 33ª, slidably engaged in the counterbores 27ª and 28ª to extend between and couple the body sections together, in the same manner that the coupling tube 33 couples the body sections A and B together in the first form of the invention, described above.

The coupling tube 33ª of the form of the invention now under consideration, is of sufficient length so that it overlies the annular recesses 36ª in the counterbores 27ª and 28ª and so that its terminal ends normally slidably engage the bottom walls 31ª and 32ª of the counterbores, when the said body sections are in sliding button engagement with each other.

The sealing means E' in the second form of the invention, is similar to that of the first form of the invention, and includes two rubber O-rings 38ª sealing between the body sections and the coupling tube 33ª of the inner coupling means D'. In this form of the invention, the O-rings 38ª are engaged in the annular recesses 36ª in the body sections and establish sliding sealing engagement with the body sections in which they are engaged and with the exterior of the coupling tube 33ª.

The advantage of the inner coupling and sealing means D and E provided by the first form of the invention, is that no radially inwardly opening annular recesses are required to be formed in the body sections to accommodate the O-rings 38, with the result that the body sections can be advantageously formed by die casting, or the like, and require no complicated costly machining operations to be performed thereon.

The advantage of the inner coupling means D' in the second form of the invention, is that the coupling tube 33ª is a simple straight tubular part and is such that it can be advantageously formed of relatively thin walled tube stock, and need not be machined, cast or otherwise formed to establish O-ring receiving notches in its ends, in the manner that the coupling tube 33 of the first form of the invention must be formed.

The outer coupling means C' in the second form of the invention, is in the nature of a split sleeve 40ª formed of resilient steel or the like, and includes a middle portion 41ª adapted to extend between the head portions 10ª and 11ª of the body sections A' and B' and overlie the outer peripheral walls 16ª and 17ª of the body sections, and substantially radially inwardly projecting bearing flanges 42ª and 43ª adapted to engage the outer bearing faces 18ª and 19ª of the body sections. The coupling sleeve 40ª is split longitudinally and is provided with radially outwardly projecting arms 50 at its opposed ends. The arms 50 are substantially parallel to each other and are provided with aligned openings 51 adapted to pass a suitable threaded bolt 52. The bolt 52 is provided with a head 53 at one end thereof to engage on the arms 50 of the sleeve 40ª and carries a suitable wing nut 54 at its other end adapted to engage the other arm 50 of the coupling sleeve. In the particular form of the invention illustrated, a suitable spacer 55 is engaged around the bolt 52 to occur between the wing nut 54 and the adjacent arm 50, to assure adequate operating clearance between the wing nut and coupling sleeve.

To afford application and removal of the split sleeve 40ª onto and off the head portions 10ª and 11ª of the swivel connection, the bearing flanges 42ª and 43ª thereof are interrupted and flattened at a point diametrically opposite the point of separation of the space between the arms 50, so that a portion of each bearing flange occurs in the same longitudinal plane as the middle portion 41ª thereof, and establishes a suitable resilient flexing portion 56, which may be considered and referred to as a hinge.

The bearing flanges 42ª and 43ª of the coupling ring 40ª are inclined relatively to the outer bearing faces 18ª and 19ª, in the same manner that the bearing flanges 42 and 43 are related to the bearing faces 18 and 19 in the first form of the invention, and so that only their inner peripheral portions normally engage the said outer bearing faces.

With the above relationship, it will be apparent that the coupling sleeve 40ª of the outer coupling means C' can be easily and quickly applied to or removed from engagement with the body sections A' and B' to make and break the connection as circumstances require. It will also be apparent that by operating the wing nut 54, the coupling sleeve 40ª can be advantageously adjusted to vary the pressure engagement of the bearing flanges 42ª and 43ª on the outer bearing faces 18ª and 19ª of the body sections, and consequently change the pressure frictional engagement of the flanges on the said faces and vary the torque required to rotate the body sections A' and B' relatively to each other. It will likewise be apparent that the adjustable coupling ring 40ª can advantageously be used in the form of the invention illustrated in Figs. 1 through 4, in the place of the non-adjustable coupling ring 40 previously described in connection with that form of the invention.

In each form of the present invention, the outer bearing faces on the head portions of the body sections and the inwardly projecting bearing flanges on the coupling rings of the outer coupling means are shown as being radially and longitudinally outwardly inclined. In practice, the angle at which the bearing flanges are inclined to the longitudinal axis of the joint is more nearly a right angle than is the corresponding angle of the outer bearing faces of the body sections, with the result that when the joint is in compression and the inner bearing faces are in sliding butted engagement, only the inner peripheral portions of the bearing flanges on the coupling sleeve engage the outer bearing faces of the body sections, and a minimum of friction force is exerted thereby. As tension is applied to the connection, or internal pressures become so high as to cause longitudinal movement and separation of the body sections, the bearing flanges are sprung apart, i. e., they yield in a direction parallel to the axis of the swivel joint. It is apparent, therefore, that the pressure that the flanges exert against the body sections is of a resiliently yielding nature and at no time is of greater magnitude than is necessary to prevent separation or disengagement of the swivel joint construction. The axial yieldability that the bearing flanges are required to possess in order for them to operate in this manner is attained, at least in part, as the result of the angular relationship between each bearing flange and the face of a body section against which it bears, because the fact that the engagement between these parts is only along the peripheral edge of the flanges causes flexure of the flange to be distributed throughout the full width thereof rather than to be concentrated within a narrow region of the flange as would be the case were flat contact maintained between flange and bearing face.

In Fig. 7 of the drawings, we have shown the body sections A and B in assembled relationship and with the coupling sleeve 40 of the coupling means C engaged around the head portions 10 and 11 thereof. The coupling ring 40 is shown having the bearing flange 43 formed at one end thereof and engaging the outer bearing face 19 of the body section B, while the bearing flange at the other end of the sleeve has not yet been formed to the configuration in which it is adapted to engage the outer bearing face 18. In Fig. 8, we have shown the partially assembled swivel joint engaged in a suitable chuck type jig 60 having jaws 61 engaging the body section B and holding the bearing flange 43 engaged on the outer bearing face 19, and a suitable releasable tie member 62, with a body engaging the head 63, carried by the chuck to extend through the body sections A and B and hold the body sections in tight aligned relationship.

The jig, with the swivel joint construction engaged therein, is rotated at a high speed and the other end of the coupling sleeve 40 is engaged by a suitable tool 64 to spring in and form the other bearing flange 42, thereby permanently coupling the body sections A and B together.

It is to be understood that the particular means illustrated in Fig. 8, for forming the flange 42 on the coupling sleeve 40, is only illustrative of one way in which the joint construction can be established or assembled and that, in practice, any suitable bending or pressing operations which would accomplish the same results could be employed.

It will be apparent that the inner coupling means and sealing means provided in the forms of the invention illustrated are arranged in the head portions of the joint construction, close to the central longitudinal axis of the joint, so that a minimum amount of bearing surface is established by the elements of the said sealing means and with the result that a minimum amount of wear and frictional resistance is established between the elements of the joint thereby.

From the foregoing it will be seen that each of the elements making up the swivel joint constructions that we provide is simple, economical and easy to manufacture, and that no time consuming, complicated or costly handling or machine operations are required in manufacture, assembly and/or installation.

Having described only typical preferred forms and applications of our invention, we do not wish to be limited or restricted to the specific details herein set forth, but wish to reserve to ourselves any variations or modifications that may appear to those skilled in the art and fall within the scope of the following claim:

Having described our invention, we claim:

A swivel joint for rotatably interconnecting two pipes, comprising two joint sections having peripheral flanges having radial plane faces thereof disposed in abutting face-to-face arrangement and said joint sections having registering central bores and cylindrical counterbores, means on the opposite ends of said abutting joint sections for securing pipe sections thereto, an annular unitary coupling sleeve having angularly inwardly projecting resilient flanges at its opposite ends embracing the peripheral flanges of the adjacent joint sections and contacting the outer surfaces of said peripheral flanges closely adjacent the bases thereof, said resilient flanges having a slightly lesser included angle than the angle formed between the said embraced peripheral flanges to normally establish a substantially circumferential line contact between the resilient flanges and the said peripheral flanges thereby yieldably urging the peripheral flanges of the joint sections into abutting relation, a tube rotatably disposed within the counterbores of the joint sections and having a bore therethrough corresponding in diameter to that of the central bores of said joint sections, said tube having a cylindrical intermediate portion of substantially the same diameter as the diameter of the cylindrical counterbores of said joint sections and having an axial extension of reduced diameter at each end of the intermediate portion, the ends of the axial extensions remote from said intermediate portion being disposed in substantially abutting relationship with the radial walls of the counterbores, the intermediate portion of the tube extending axially of each counterbore to overlie the circumferential line of face-to-face abutment of the joint sections and spaced from the radial walls of the counterbores to define at each end of the tube an annular seal chamber of rectangular cross-section, the outer circumference and one end wall of each seal chamber being defined by a said counterbore, the other end wall of each seal chamber being defined by the adjacent end of said intermediate portion of the tube, the inner circumference of each seal chamber being defined by the outer surface of the adjacent one of said tube extensions, and an annular seal disposed within each seal chamber and maintaining sealing engagement between the cylindrical surfaces of the said counterbore of the adjacent joint section and of said adjacent tube extension.

References Cited in the file of this patent

UNITED STATES PATENTS

| Re. 19,132 | McGuirk | Apr. 3, 1934 |
| 1,794,905 | Kass | Mar. 3, 1931 |
| 1,857,847 | Heinemann | May 10, 1932 |
| 2,412,394 | Giles | Dec. 10, 1946 |
| 2,479,711 | Arutunoff | Aug. 23, 1949 |
| 2,485,976 | Main | Oct. 25, 1949 |
| 2,542,701 | Press | Feb. 20, 1951 |
| 2,635,900 | Mayo | Apr. 21, 1953 |
| 2,663,582 | Sebok | Dec. 22, 1953 |

FOREIGN PATENTS

| 28,930 | Great Britain | Dec. 10, 1909 |
| 310,745 | Italy | Sept. 4, 1933 |
| 478,766 | Canada | Nov. 20, 1951 |
| 692,571 | Great Britain | June 10, 1953 |
| 1,046,421 | France | July 8, 1953 |